United States Patent
Sowa et al.

(10) Patent No.: US 10,280,933 B2
(45) Date of Patent: May 7, 2019

(54) PUMP WITH CUTTING WHEEL AND PRE-CUTTER

(71) Applicant: Brinkmann Pumpen K.H. Brinkmann GmbH & Co. KG, Werdohl (DE)

(72) Inventors: Guido Sowa, Iserlohn (DE); Dirk Wenderott, Castrop-Rauxel (DE)

(73) Assignee: Brinkmann Pumpen K.H. Brinkmann GmbH & Co. KG, Werdohl (DE)

( * ) Notice: Subject to any disclaimer, the term of this patent is extended or adjusted under 35 U.S.C. 154(b) by 257 days.

(21) Appl. No.: 14/915,601

(22) PCT Filed: Aug. 18, 2014

(86) PCT No.: PCT/EP2014/067551
§ 371 (c)(1),
(2) Date: Feb. 29, 2016

(87) PCT Pub. No.: WO2015/032608
PCT Pub. Date: Mar. 12, 2015

(65) Prior Publication Data
US 2016/0208812 A1    Jul. 21, 2016

(30) Foreign Application Priority Data

Sep. 4, 2013  (DE) .................... 20 2013 103 972 U

(51) Int. Cl.
*B02C 18/16*    (2006.01)
*B23Q 11/00*    (2006.01)
(Continued)

(52) U.S. Cl.
CPC .......... *F04D 29/2288* (2013.01); *B02C 18/16* (2013.01); *B23Q 11/1069* (2013.01);
(Continued)

(58) Field of Classification Search
CPC ..... B02C 18/062; B02C 18/08; B02C 18/083; B02C 18/162; B02C 18/188; F04D 7/045;
(Continued)

(56) References Cited

U.S. PATENT DOCUMENTS 4,454,993 A * 6/1984 Shibata .................... F04D 7/045
                                                      241/46.017
4,842,479 A * 6/1989 Dorsch .................... F04D 7/045
                                                      415/121.1
(Continued)

FOREIGN PATENT DOCUMENTS

DE        3034378 A1 * 4/1982 ............. B02C 18/08
DE    102008031842 B3    3/2010
(Continued)

OTHER PUBLICATIONS

English abstract of UA 79858 C2 (Jul. 25, 2007) from Espacenet.*

*Primary Examiner* — Igor Kershteyn
*Assistant Examiner* — Christopher R Legendre
(74) *Attorney, Agent, or Firm* — Richard M. Goldberg

(57) ABSTRACT

A pump having a cutting wheel (20) and a pre-cutter (26) driven by a shaft portion (24) that projects axially from the cutting wheel (20) and has a plurality of wings (28) that extend radially from the shaft portion (24), wherein the wings (28) differ in their axial arrangement on the shaft portion (24).

3 Claims, 3 Drawing Sheets

(51) Int. Cl.
  *B23Q 11/10* (2006.01)
  *F04D 7/04* (2006.01)
  *F04D 29/043* (2006.01)
  *F04D 29/22* (2006.01)

(52) U.S. Cl.
  CPC .......... *F04D 7/045* (2013.01); *F04D 29/043* (2013.01); *B02C 2018/164* (2013.01); *B23Q 11/0057* (2013.01)

(58) Field of Classification Search
  CPC ............ F04D 29/2288; B23Q 11/0057; B23Q 11/1069
  See application file for complete search history.

(56) References Cited

U.S. PATENT DOCUMENTS

| | | | |
|---|---|---|---|
| 5,460,483 A | 10/1995 | Dorsch | |
| 6,224,331 B1 | 5/2001 | Hayward et al. | |
| 2009/0067992 A1 | 3/2009 | Keener | |
| 2010/0003124 A1 * | 1/2010 | Wagner et al. | |
| 2016/0208812 A1* | 7/2016 | Sowa | B02C 18/16 |
| 2016/0215794 A1* | 7/2016 | Sowa | F04D 1/003 |

FOREIGN PATENT DOCUMENTS

| | | | | |
|---|---|---|---|---|
| DE | 102009021659 A1 * | 1/2011 | ............ | F04D 7/045 |
| JP | 2003083275 A * | 3/2003 | | |
| JP | 200792741 A | 4/2007 | | |
| JP | 2012233457 A | 11/2012 | | |
| UA | 79858 C2 | 7/2007 | | |
| WO | WO 2007143853 A1 * | 12/2007 | ......... | B02C 18/0092 |

\* cited by examiner

PUMP WITH CUTTING WHEEL AND PRE-CUTTER

BACKGROUND OF THE INVENTION

The invention relates to a pump having a cutting wheel and a pre-cutter driven by a shaft portion that projects axially from the cutting wheel and has a plurality of wings that extend radially from the shaft portion.

A pump of this type is known from DE 10 2008 031 842 B3 and is used for example in machine tools for circulating lubricating coolant emulsions that are contaminated with metal chippings. This pump is a centrifugal pump that has, in addition to a radial impeller, an axial impeller disposed upstream of the radial impeller, said axial impeller being configured as a cutting impeller and having, at its upstream end, cutting edges that cooperate with stationary counter blades arranged radially in a suction passage, so that chippings and other contaminants that have been sucked in are cut-off and chopped. The pre-cutter serves for chopping coarse contaminants before they are sucked-in by the axial impeller and are then chopped further.

U.S. Pat. No. 6,224,331 B1 and U.S. Pat. No. 5,460,483 show pumps with similar pre-cutters.

In a typical installation scenario, the pump is disposed vertically in a collecting vessel for the liquid coolant, so that the pre-cutter is disposed at a certain vertical distance from the bottom of the vessel. The wings of the pre-cutter are inclined relative to the plane of rotation of the wings, similarly as in a propeller, so that the chippings can be sucked-in and conveyed better.

SUMMARY OF THE INVENTION

It is an object of the invention to provide a pump of the type indicated above, wherein the suction and conveying properties for the chippings are improved.

According to the invention, this object is achieved by the feature that the wings differ in their axial arrangement on the shaft portion.

The different axial arrangement of the wings on the shaft portion has the effect, that, when the pump is installed vertically, one of the wings has a portion or an end that is closer to the bottom of the vessel than any part of each of the other wings. Consequently, since this wing comes very close to the bottom of the vessel, it is capable of producing a suction that is capable of lifting and sucking-in also more heavier chippings that rest on the bottom of the vessel. The other wing or wings that are disposed with an axial offset further upwards on the shaft portion will then assure that the chipping that has been lifted in this way is conveyed further to the suction opening of the pump. Thus, the invention makes it possible to suck-in more heavier chippings from the bottom of the vessel or to convey them to the cutting wheel more efficiently.

The axial arrangements of the wings on the shaft portion may differ from one another for example in that the base portions with which the wings adjoin the periphery of the shaft portion are offset relative to one another in axial direction. Further, the axial arrangements may be different in that the wings form different angles with the axis of the shaft portion.

In a particularly preferred embodiment, one wing, the base portion of which is disposed in the lowest position, i.e. closest to the distal end of the shaft portion, forms an obtuse angle with the axis of the shaft portion, so that its free end points downwardly towards the bottom of the vessel when the pump is installed vertically, whereas another wing, the base portion of which is disposed in a higher position, forms an acute angle with the axis, so that its free end points upwardly towards the suction opening. Then, the chippings can be lifted efficiently from the bottom of the vessel by means of the downwardly slanting wing, whereas the upper wing that slants in the opposite direction directs the flow of liquid medium and consequently also the movement of the lifted chippings into a direction having a component directed inwardly towards the axis of the shaft portion. Consequently, this wing assures that the chippings will not be flung away in radial direction but will enter into the suction opening of the pump.

BRIEF DESCRIPTION OF THE DRAWINGS

An embodiment example will now be described in conjunction with the drawings, wherein.

DETAILED DESCRIPTION

Figure 1:
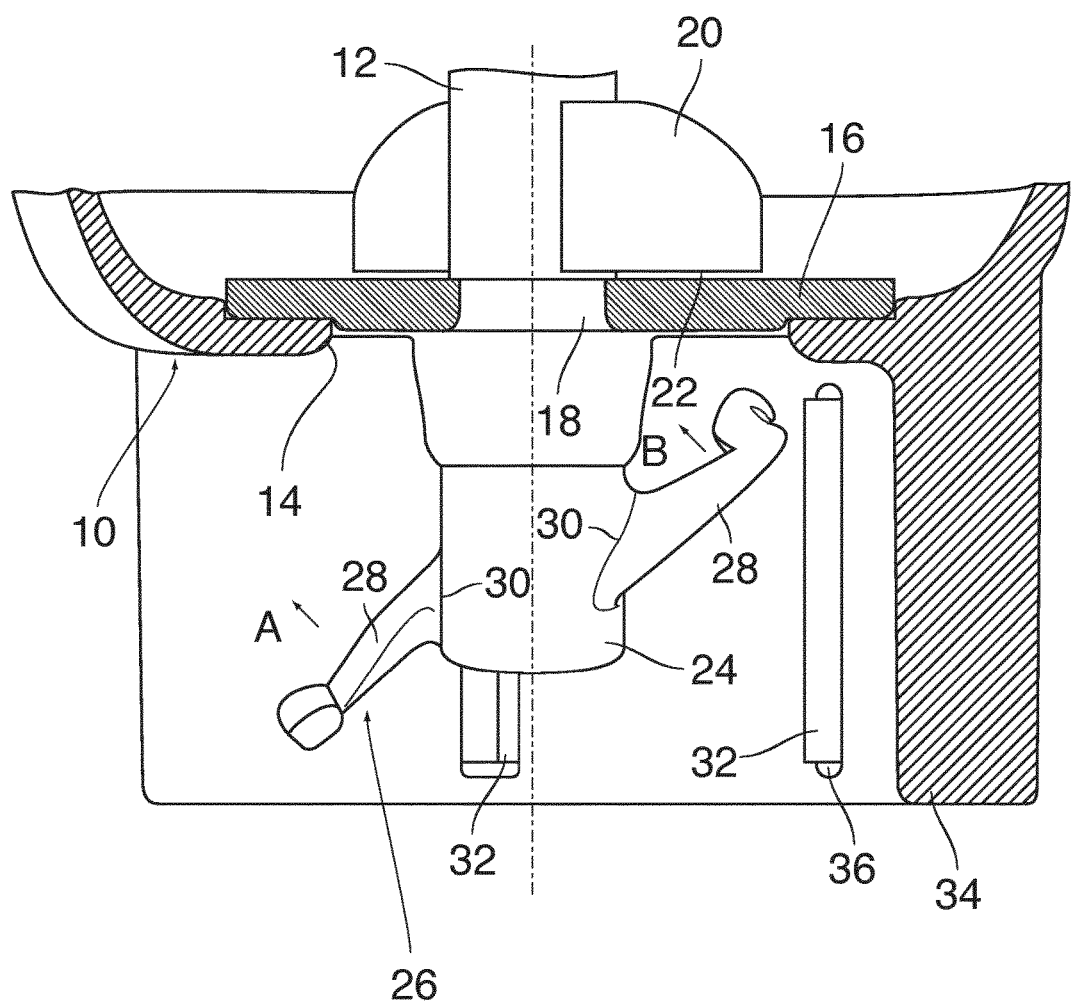
FIG. 1 is an axial cross-sectional view of an intake part of a pump according to the invention.

The pump, a part of which has been shown in an axial section in FIG. 1, comprises a casing 10 which rotatably supports a shaft 12 and forms a suction opening 14 that is arranged coaxially with the shaft. In another part, which has not been shown and is situated more upwardly, the casing 10 forms a pump chamber accommodating a rotating impeller, e.g. a radial impeller that is keyed onto the shaft 12.

It shall be assumed in the following that the pump has been installed in a vertical orientation in a collecting vessel (not shown) for a lubricating coolant, so that its suction opening 14 faces the bottom of the vessel and is immersed into the liquid contained in this vessel. Thus, the liquid will be sucked-in by the pump upwardly through the suction opening 14.

Inserted in the suction opening 14, there is cutting plate 16 which blocks a larger part of the suction opening and leaves only four smaller passages 18. In the sectional view in FIG. 1, the section plane, indicated by a line I-I in FIG. 2, extends offset from the centre of the suction opening, so that one of the passages 18 is cut through.

Figure 2:
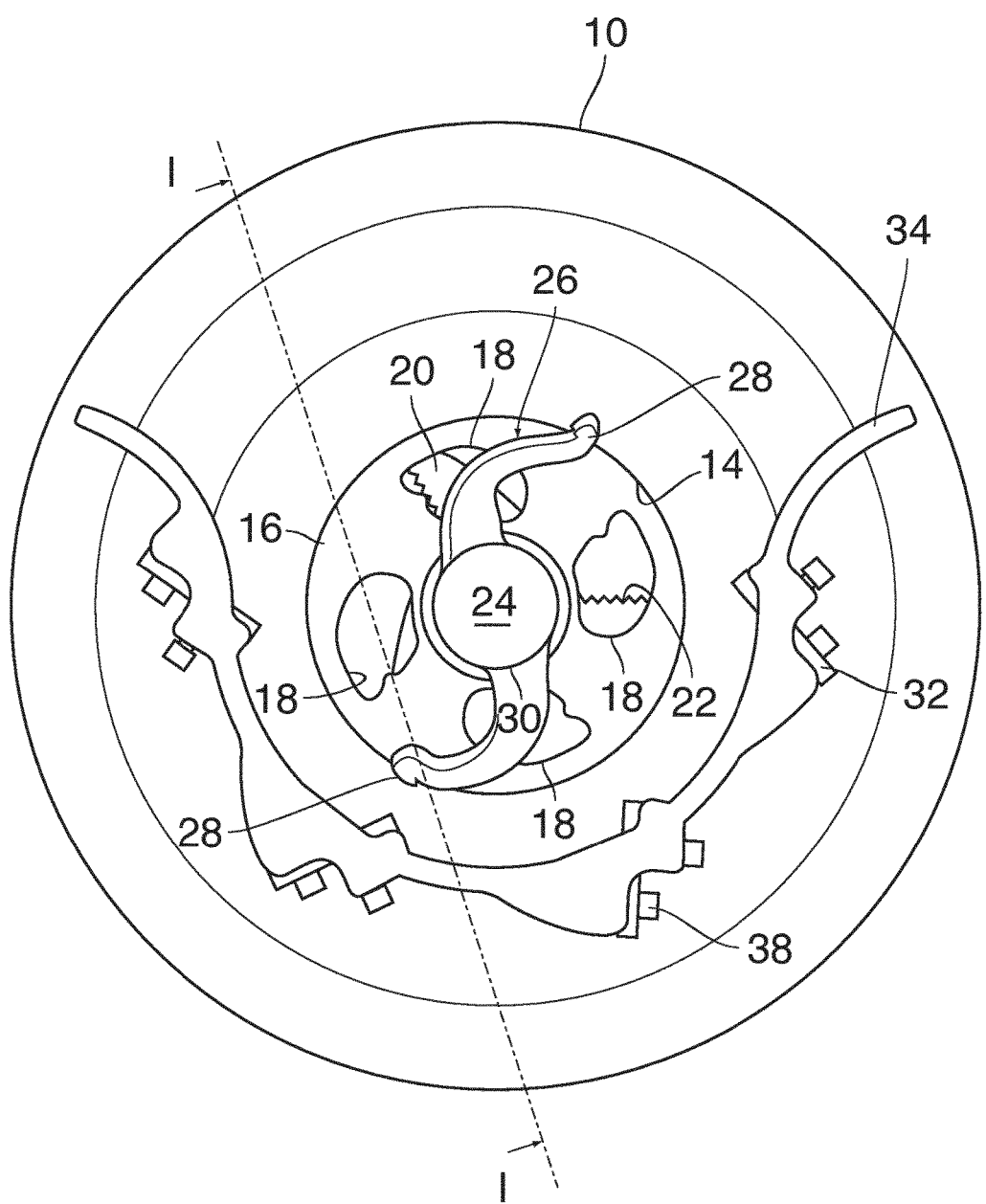
FIG. 2 is a perspective view of the intake part from below.

A cutting wheel 20 is mounted on the shaft 12 above the cutting plate 16, and blades of this cutting wheel are formed at their lower end with cutting edges 22 which, when the cutting wheel 20 rotates, move closely above and across the top ends of the passages 18. In FIG. 2, the toothed cutting edges 22 of the cutting wheel can be seen through the passages 18. The blades of the cutting wheel 20 (three blades arranged with angular spacings of 120° in example shown in FIG. 2) may be curved in the direction of rotation, so that the cutting wheel 20 acts as a radial impeller. Optionally, however, they might also have a helical shape so that the cutting wheel would act as an axial impeller.

When, as is frequently the case for machine tools, the lubricating coolant that is pumped back from the tool of the machine contains chippings of the work piece that has been processed, e.g. steel chippings, these will be sucked-in through the suction opening 14 together with the liquid, and when they pass through the passages 18 they will be caught by the cutting edges 22 of the cutting wheel and will be cut at the edge of the passages 18. In this way, the chippings can be prevented from becoming entangled and clogging or blocking the pump. In addition, the chippings will be cut to a size in which they can more easily be entrained in the flow of the coolant. This reduces the risk of clogging downstream pipings.

The shaft 12 of the pump passes through a central bore of the cutting plate 16 and forms, below this cutting plate, a shaft portion 24 that carries a pre-cutter 26 for precutting the chippings. As shown in FIG. 2, the pre-cutter 26 has two wings 28 which, when seen in a projection onto the plane orthogonal to the axis of the shaft 12 (the plane of the drawing in FIG. 2), are so arranged and shaped that they are symmetric under a 180° rotation about the axis of the shaft 12. The wings 28 have a curved shape and extend from base portions 30, with which they are attached to the shaft portion 24, at first radially outwardly, but are then curved into the circumferential direction, so that their free ends are trailing in the direction of rotation (counter-clockwise in FIG. 2).

While the wings 28 are symmetric in the projection shown in FIG. 2, it can be seen in FIG. 1 that they differ from one another in their axial arrangement on the shaft portion 24. In particular, the base portions 30 of the two wings are axially offset relative to one another. In case of the left wing in FIG. 1, the base portion 30 is closer to the distal end of the shaft portion 24, i.e. in a lower position, whereas in case of the right wing in FIG. 1, it is disposed in a higher position, closer to the cutting plate 16.

Moreover, the left wing 28 in FIG. 1 slants downwardly towards its free end, so that it forms an obtuse angle of approximately 135° with the axis of the shaft 12, whereas the other wing slants upwardly and, consequently, forms an acute angle of approximately 45° with the axis of the shaft 12.

Furthermore, the wings 28, in particular their intermediate portions extending between the base portion 30 and the free end, are angled like propeller wings, so that the wings, together, create an upwardly directed suction that will cause the liquid medium to be displaced towards the suction opening 14.

As the left wing 28 in FIG. 1 is closer to the bottom of the vessel, it is particularly suited for lifting relatively heavy chippings that rest on the bottom of the vessel and to convey them towards the suction opening 14. Due to the slanting posture of this wing, it imparts to the liquid medium and to the chippings a momentum that has approximately the direction indicated by an arrow A in FIG. 1 and, consequently, has a component directed radially outwardly. However, before the chippings can move in radial direction too far away from the shaft portion 24, they enter into a region where they are affected by the other wing 28 (the right wing in FIG. 1) which imparts them a momentum in the direction of the arrow B and, consequently, drives them back in the direction towards the axis of the shaft portion 24 and hence in the direction of the passages 18 of the cutting plate 16. In this way, the two wings 28 operate, so to say, in work-sharing fashion, with one wing having the task to lift heavy chippings from the bottom of the vessel and the other wing having the task of conveying these chippings further towards the suction opening 14 where the chippings will then be cut by means of the cutting wheel 20 in the passages 18.

However, thanks to the curved shape of the wings 28 and thanks to the slanting postures of these wings, the chippings are not moved directly from the bottom of the vessel to the passages 18, but instead that are at first driven radially outwardly at the curved leading edges of the wings 28, so that they enter into the range of action of stationary counter blades 32 that are held in a blade carrier 34 and extend in parallel with the axis of the shaft 12 and the shaft portion 24.

In the example shown, the counter-blades 32 are formed by rectangular plates made of a hard material (e.g. duplex cast steel, hard metal, hardened tool steel) each of which forms a rupture edge directed towards the pre-cutter 26. As the outer peripheral portions of the wings 28 move past the counter blades 32 in only a little distance, the chippings entrained therewith, especially long chippings that tend to become entangled, are fragmented at the counter blades 32 so that they may smoothly be moved on towards the passages 18.

In the example shown, the blade carrier 34 is shaped as a vertical wall with a U-shaped cross-section which flares outwardly in funnel-shape at the open side of the U (upwards in FIG. 2). The counter-blades 32 extend through openings 36 (FIG. 1) of the blade carrier 34 and are mounted detachably by means of bolts 38 (FIG. 2), so that they may be replaced when the rupture edges are worn-out.

Figure 3:
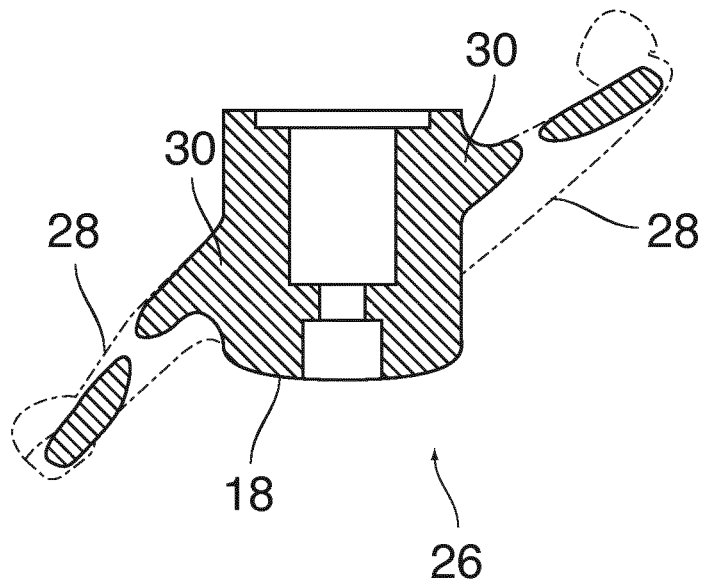
FIG. 3 an axial section of a pre-chopper.
Figure 4:
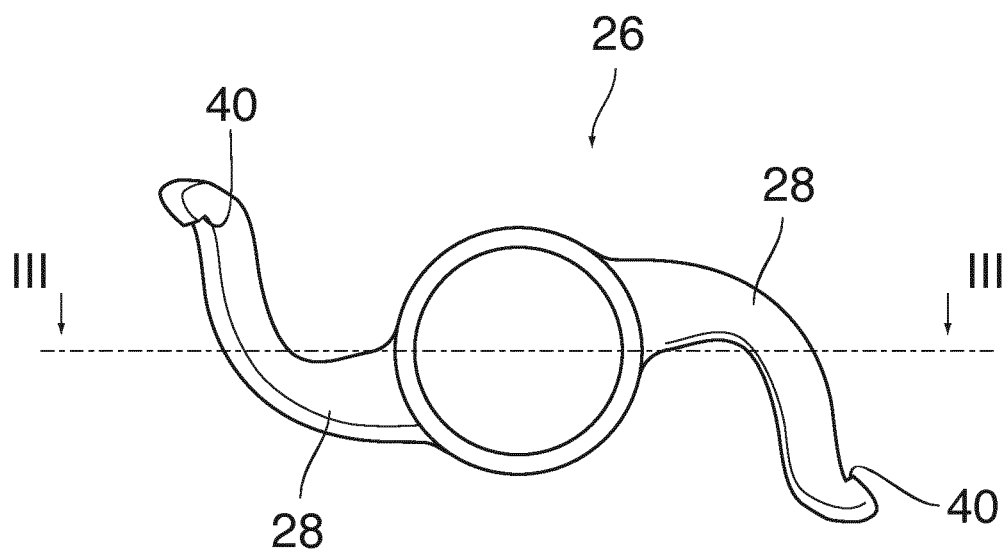
FIG. 4 the pre-chopper in a view from below.

The pre-cutter 26 has been shown separately in FIGS. 3 and 4. FIG. 3 shows an axial section along the line III-III in FIG. 4 and clearly shows the axial offset between the base portions 30 of the two wings 28.

Further, it can be seen especially in FIG. 4 that each wing 28 has a hook-shaped, outwardly angled catch 40 at its free end. When the chippings impinge onto the convexly curved front edge of the wing 28 and slide radially outwards along the wing, the catch 40 obstructs this slide movement to some extent, so that the chippings are somewhat held back in their position at the outer end of the wing, until this end of the wing moves past the rupture edge of one of the counter blades 32 and the chippings that are "suspended" at the catch are fragmented. In this way, a particularly efficient pre-chopping of the chippings can be achieved.

What is claimed is:

1. A pump comprising:
   a cutting wheel,
   a rotating shaft portion that projects axially from the cutting wheel and has an axis,
   a pre-cutter driven by the shaft portion and having only first and second wings that extend radially from the shaft portion,
   wherein the first and second wings have base portions with which the first and second wings adjoin a periphery of the shaft portion, with the base portions being offset relative to one another along the axis of the shaft portion,
   wherein the first and second wings extend at different angles with respect to the axis of the shaft portion,
   wherein said first and second wings are arranged and shaped such that, when seen in a projection onto a plane orthogonal to the axis of the shaft portion, they are symmetric under a rotation of 180° degrees about the axis of the shaft portion, and
   wherein said first wing has the base portion thereof closer to a distal end of the shaft portion than the base portion of the second wing and forms an obtuse angle with the axis of the shaft portion, so that said first wing points axially away from the cutting wheel, and whereas the second wing forms an acute angle with the axis of the shaft portion so as to point toward the cutting wheel in an opposite direction from said first wing,
   wherein each wing, when seen in a projection onto a plane orthogonal to the axis of the shaft portion, has a shape that is convexly curved in a direction of rotation of the shaft portion, and
   further including a crest of stationary counter blades surrounding the pre-cutter and wherein free ends of the first and second wings move past the counter blades with a distance between the crest of counter blades and free ends of the first and second wings, when the pre-cutter rotates, wherein the counter blades have a longitudinal axis that extends in parallel with the axis of the shaft portion, and each counter blade has a span along the longitudinal axis that is axially coextensive with at least a portion of each wing so that portions of each counter blade lie in a common radial plane with the free ends of both said wings so as to be in opposing relation to said free ends in a manner so as to crush any material between both wings and the counterblades as both wings rotate with the rotating shaft portion.

2. The pump according to claim 1, wherein each wing has a leading edge and at its free end an outwardly angled catch that obstructs movement of chippings that slide along the respective leading edge.

3. The pump according to claim 1, wherein the pump is configured to be disposed vertically in a collecting vessel so that the pre-cutter is disposed at a predetermined vertical distance from a bottom of the vessel and is facing the bottom of the vessel.

* * * * *